United States Patent
Park

(10) Patent No.: US 7,369,190 B2
(45) Date of Patent: May 6, 2008

(54) POSITION-VARIABLE LOCKING STRUCTURE FOR LIQUID CRYSTAL PANEL

(75) Inventor: Eung Sik Park, Seoul (KR)

(73) Assignee: Boe Hydis Technology Co., Ltd., Kyoungki-do (KR)

( * ) Notice: Subject to any disclaimer, the term of this patent is extended or adjusted under 35 U.S.C. 154(b) by 493 days.

(21) Appl. No.: 11/051,716

(22) Filed: Feb. 4, 2005

(65) Prior Publication Data
US 2005/0174506 A1   Aug. 11, 2005

(30) Foreign Application Priority Data
Feb. 6, 2004   (KR) .................... 10-2004-0007930

(51) Int. Cl.
G02F 1/1333   (2006.01)
(52) U.S. Cl. ....................................... 349/58
(58) Field of Classification Search ............ 349/58–60
See application file for complete search history.

(56) References Cited

U.S. PATENT DOCUMENTS

| 5,494,447 | A  | * | 2/1996 | Zaidan ........................ 439/31 |
| 5,777,704 | A  | * | 7/1998 | Selker ......................... 349/58 |
| 5,900,848 | A  | * | 5/1999 | Haneda et al. ............... 345/1.1 |
| 6,351,372 | B1 | * | 2/2002 | Kim ........................... 361/683 |
| 7,065,835 | B2 | * | 6/2006 | Kuramochi ................... 16/357 |

* cited by examiner

Primary Examiner—Andrew Schechter
(74) Attorney, Agent, or Firm—Ladas & Parry LLP

(57) ABSTRACT

Disclosed is a position-variable coupling structure for a liquid crystal panel, capable of assembling the liquid crystal panel with an external device by varying a position of a guide groove formed in a top case surrounding the liquid crystal panel according to a position of a guide groove formed in the external device. The guide groove is formed at both lateral portions of the top case surrounding the liquid crystal panel in a length direction of the lateral portions. A bracket is coupled to the top case in such a manner that the bracket moves along the guide groove. A screw is provided to couple the top case with an external device coupling bar.

1 Claim, 6 Drawing Sheets

POSITION-VARIABLE LOCKING STRUCTURE FOR LIQUID CRYSTAL PANEL

BACKGROUND OF THE INVENTION

1. Field of the Invention

The present invention relates to a position-variable locking structure for a liquid crystal panel, and more particularly to a position-variable locking structure for a liquid crystal panel, capable of assembling the liquid crystal panel with an external device by varying a position of a guide groove formed in a top case surrounding the liquid crystal panel depending on a position of a guide groove formed in the external device.

2. Description of the Prior Art

A liquid crystal display device is different from a CRT in that the liquid crystal display device does not generate light by itself. Accordingly, a light source is provided at a rear portion of a liquid crystal display panel so as to visually display an image in the liquid crystal display panel. Such a light source of the liquid crystal display device may include a backlight unit using a cold cathode fluorescent lamp (CCFL). The backlight unit transmits light radiated from the cold cathode fluorescent lamp through a lightguide plate in such a manner that the light is radiated onto a surface of a liquid crystal device from beneath the liquid crystal device. In order to efficiently transfer the light radiated from the cold cathode fluorescent lamp into the lightguide plate, a lamp reflective member is provided.

The lamp reflective member is integrally formed with the cold cathode fluorescent lamp and is assembled with the backlight unit.

FIG. 1 is a perspective view showing a conventional liquid crystal panel 102 assembled with an external device, and FIG. 2 is a sectional view showing the conventional liquid crystal panel 102 assembled with the external device.

The liquid crystal panel 102 is positioned above a backlight unit, and a top case 104 made from a metal is installed along an outer peripheral portion of the liquid crystal panel 102 in order to protect components from external impact applied thereto. A guide groove 106 is formed at a side of the top case 104 and a screw 112 is screw coupled into the guide groove 106 by passing through hole 110 Of coupling bar 108 so as to fixedly couple the top case 104 with a coupling bar 108, which is used for coupling the external device.

The guide groove 106 formed in the top case 104 must match with a hole of the external device, that is, a hole 110 of the coupling bar 108. Accordingly, if a position of the hole formed in the external device is changed, a position of the guide groove 106 formed in the top case 104 also must be changed. For this reason, the top case is not adaptable for assembling the liquid crystal panel with various external devices. Therefore, there is necessary to provide a top case capable of assembling a liquid crystal panel with various external devices.

SUMMARY OF THE INVENTION

Accordingly, the present invention has been made to solve the above-mentioned problems occurring in the prior art, and an object of the present invention is to provide a position-variable locking structure for a liquid crystal panel, capable of assembling the liquid crystal panel with an external device by varying a position of a guide groove formed in a top case surrounding the liquid crystal panel depending on a position of a guide groove formed in the external device.

In order to accomplish the object, there is provided a position-variable coupling structure for a liquid crystal panel, the position-variable coupling structure comprising: a top case surrounding the liquid crystal panel; a guide groove formed in a length direction of the lateral portions of the top case; a bracket coupled to the top case in such a manner that the bracket moves along the guide groove; external device coupling bar formed a hole, the hole is corresponding to the guide groove; and a coupling means for coupling the bracket by passing through hole of a external device coupling bar so as to fixedly couple the top case 104 with an external device coupling bar.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
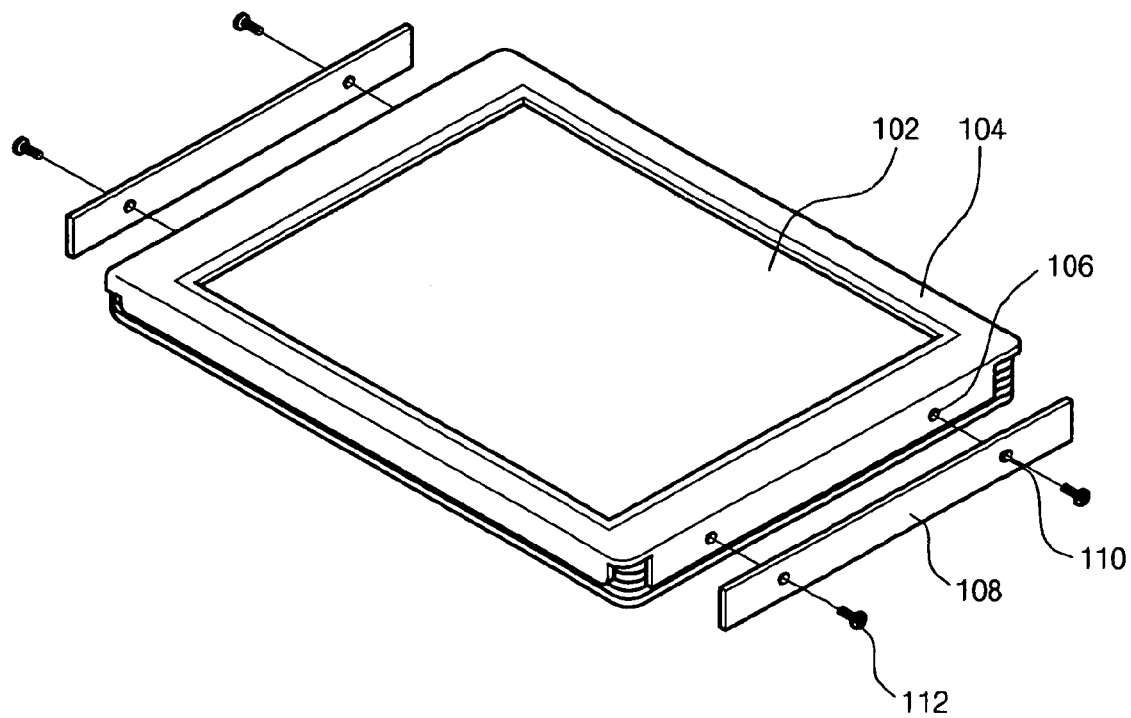
FIG. 1 is a perspective view showing a conventional liquid crystal panel assembled with an external device.
Figure 2:
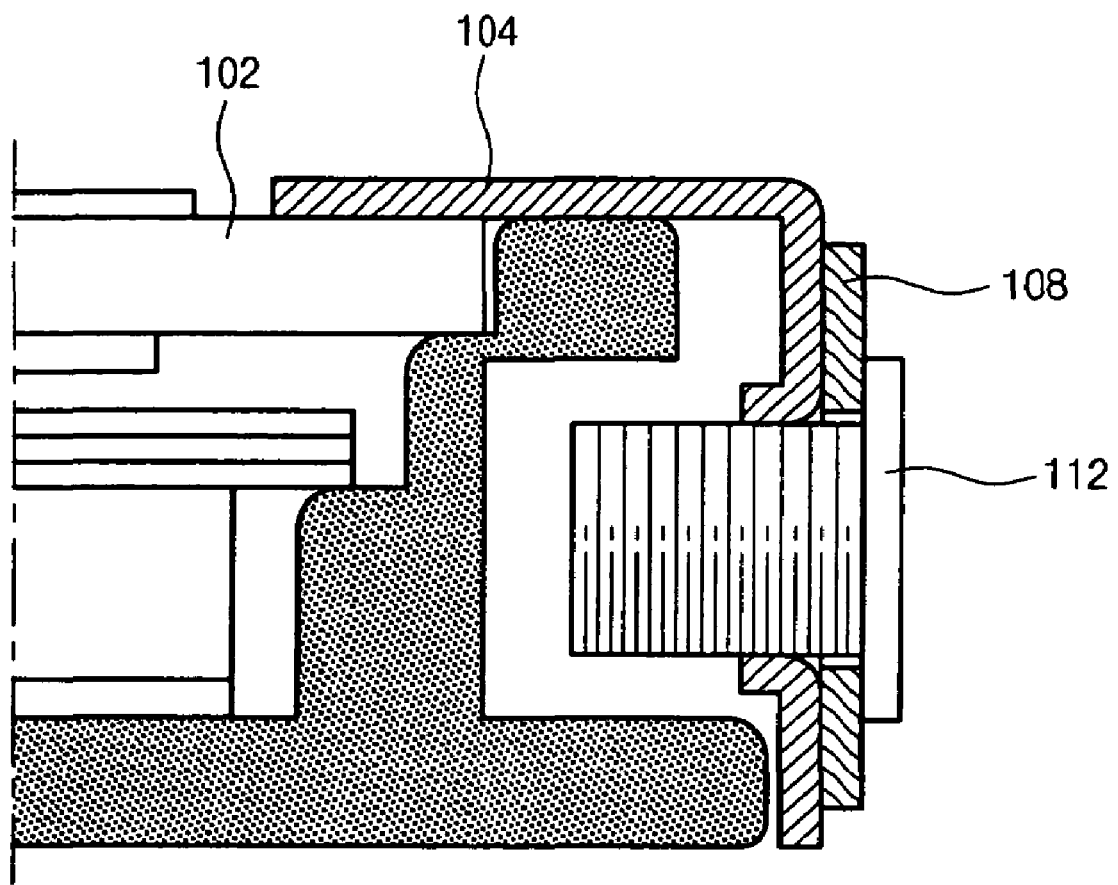
FIG. 2 is a sectional view showing a conventional liquid crystal panel assembled with an external device.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 3:
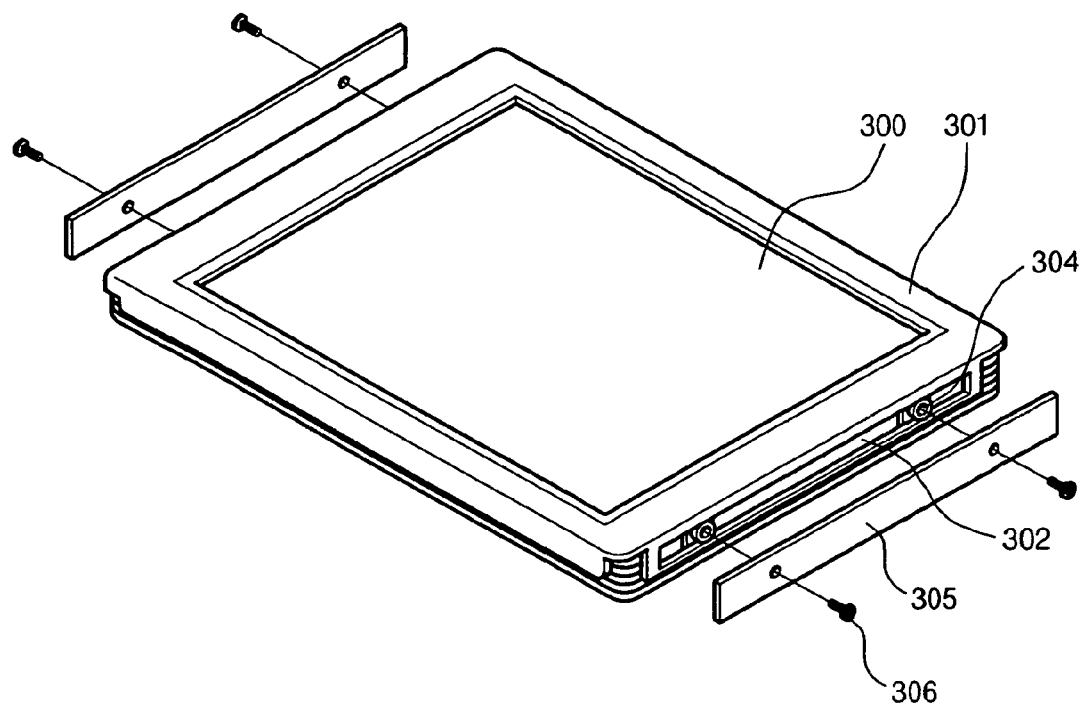
FIG. 3 is a perspective view showing a position-variable locking structure for a liquid crystal panel according to one embodiment of the present invention.
Figure 4:
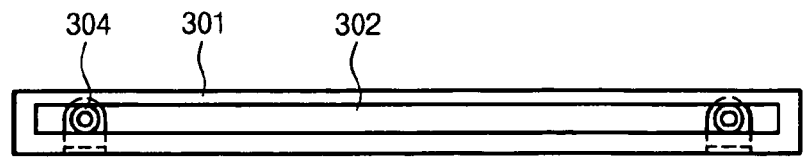
FIG. 4 is a side view of a top case shown in FIG. 3.
Figure 5:
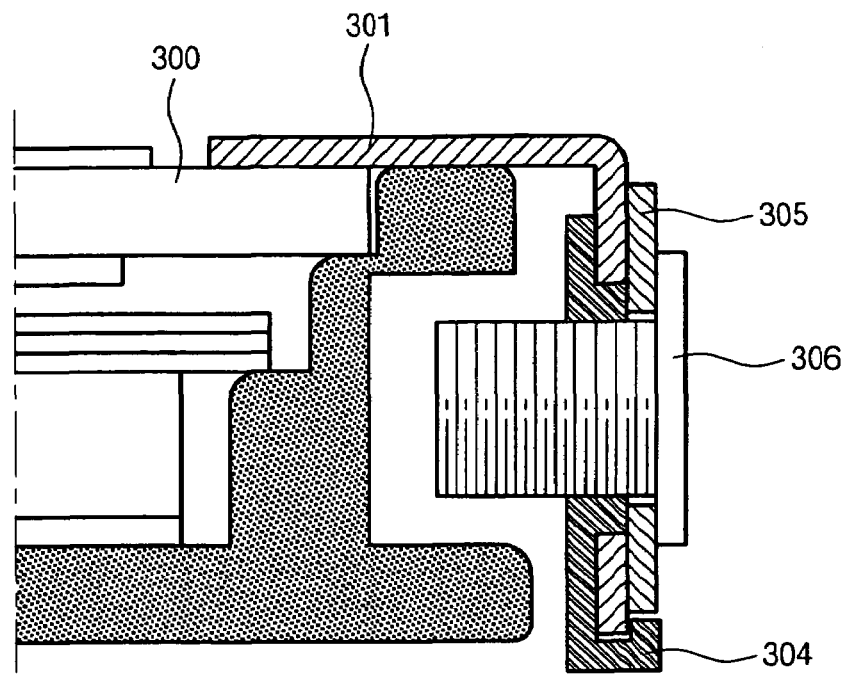
FIG. 5 is a sectional view of a liquid crystal panel shown in FIG. 3 when the liquid crystal panel is assembled with an external device.

FIG. 3 is a perspective view showing a position-variable locking structure for a liquid crystal panel 300 according to one embodiment of the present invention, FIG. 4 is a side view of a top case 301 shown in FIG. 3, and FIG. 5 is a sectional view of the liquid crystal panel 300 shown in FIG. 3 when the liquid crystal panel 300 is assembled with an external device.

A position-variable mounting bracket structure according to one embodiment of the present invention includes a guide groove 302, a bracket 304 and a screw 306.

The top case 301 surrounds an outer peripheral portion of the liquid crystal panel 300 so as to protect the liquid crystal panel 300 from external impact applied thereto. The guide groove 302 is formed at both lateral portions of the top case 301 surrounding the liquid crystal panel 300.

The bracket 304 is coupled to the top case 301 in such a manner that the bracket 304 can move along the guide groove 302 formed in the top case 301.

Figure 6:
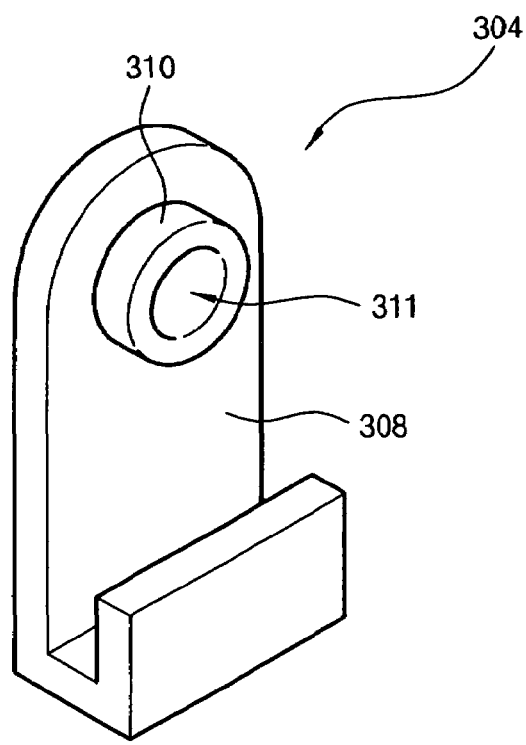
FIG. 6 is an enlarged perspective view of a bracket shown in FIG. 3.
Figure 7:
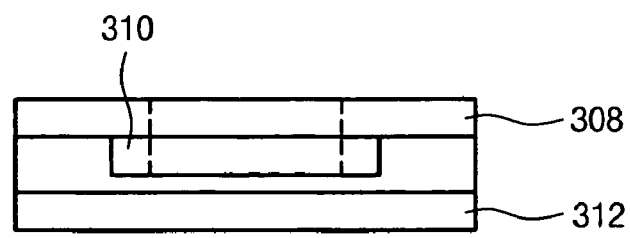
FIG. 7 is a plan view of a bracket shown in FIG. 6.
Figure 8:
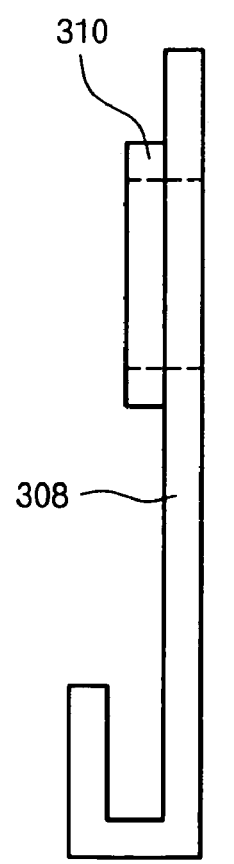
FIG. 8 is a side view of a bracket shown in FIG. 6.
Figure 9:
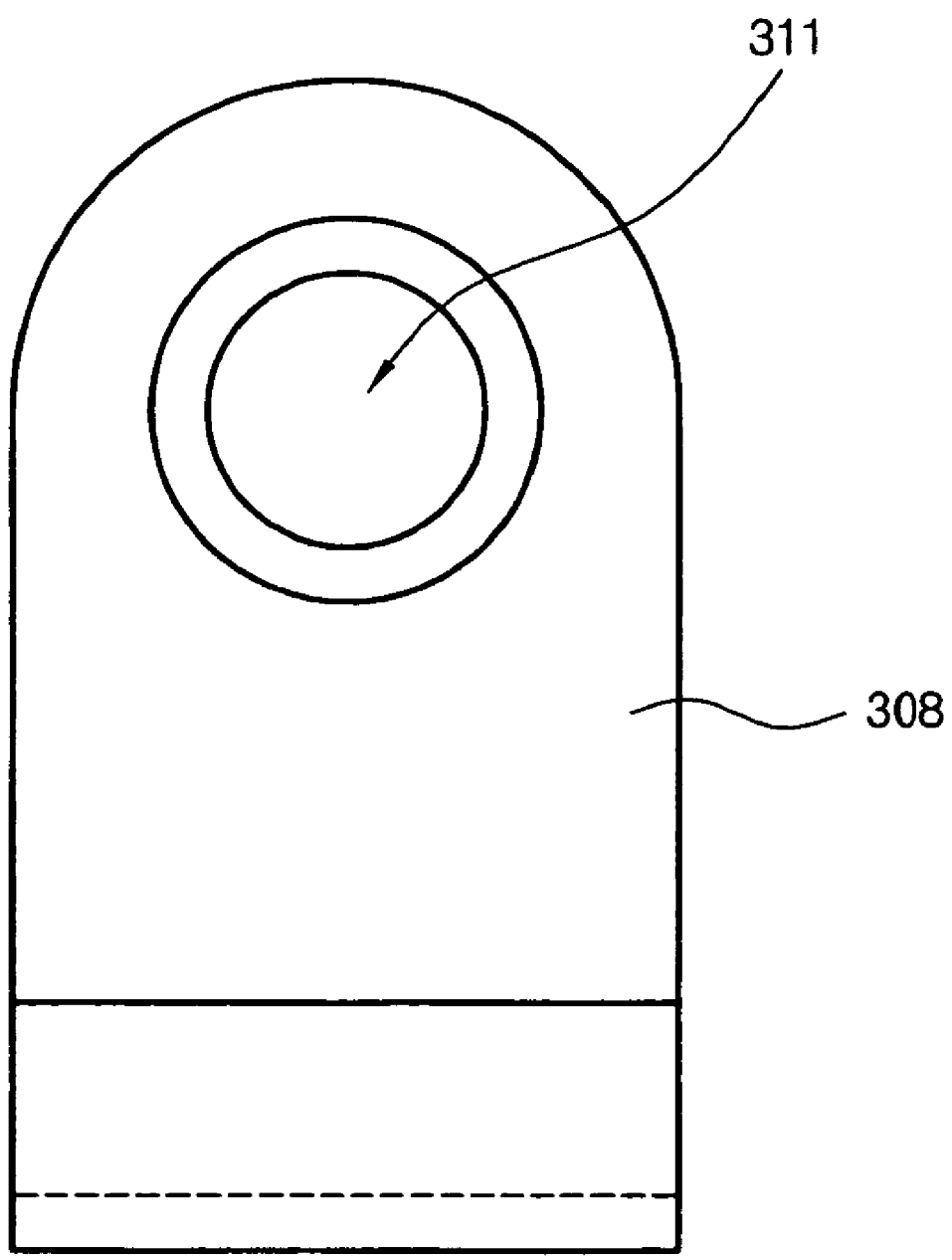
FIG. 9 is a rear view of a bracket shown in FIG. 6.

FIG. 6 is an enlarged perspective view of the bracket 304 shown in FIG. 3, FIG. 7 is a plan view of the bracket 304 shown in FIG. 6, FIG. 8 is a side view of the bracket 304 shown in FIG. 6, and FIG. 9 is a rear view of the bracket 304 shown in FIG. 6.

The bracket 304 includes a body 308, a perforated hole 311 formed at a center part of body 308, a screw-coupling tap 310 surrounded the perforated hole 311 and protruding from a surface of the body 308, and a flange 312 extending from one end of the body 308 in such a manner that the flange 312 may surround one edge portion of the top case 301.

The top case 301 is coupled to an external device coupling bar 305 by means of a screw 306.

Hereinafter, assembling work for the liquid crystal panel with respect to the external device by using the position-variable mounting bracket structure according to the present invention will be described.

Firstly, the screw 306 is screw-coupled into the perforated hole 311 formed at the center of the screw-coupling tap 310 of the bracket 304 by passing through a external device coupling bar 108. Thus, the top case 301 is coupled with the external device coupling bar 305 so that the liquid crystal panel 300 is coupled with the external device.

At this time, the bracket 304 can move along the guide groove 302 formed in lateral portions of the top case.

Although a preferred embodiment of the present invention has been described for illustrative purposes, those skilled in the art will appreciate that various modifications, additions and substitutions are possible, without departing from the scope and spirit of the invention as disclosed in the accompanying claims.

For example, the present invention may be applicable for a side mounting type liquid crystal panel and a front mounting type liquid crystal panel by varying an assembling position of the bracket.

As described above, the present invention provides a top case assembling structure for a liquid crystal panel, in which a position of a guide groove formed in a top case may vary according to a position of a hole formed in an external, so the liquid crystal panel can be assembled with various external devices.

What is claimed is:

1. A position-variable coupling structure for a liquid crystal panel, the position-variable coupling structure comprising:
  a top case surrounding the liquid crystal panel;
  a guide groove formed in a length direction of the lateral portions of the top case;
  a bracket coupled to the top case in such a manner that the bracket moves along the guide groove;
  an external device coupling bar formed with a hole, the hole corresponding to the guide grove; and
  a coupling means for coupling the bracket by passing through the hole of the external device coupling bar so as to fixedly couple the top case with an external device coupling bar;
  wherein the coupling means includes a screw and the bracket includes a body, a perforated hole formed at a center part of the body, a screw-coupling tap surrounding the perforated hole and protruding from a surface of the body, and a flange extending from one end of the body in such a manner that the flange surrounds one edge portion of the top case.

* * * * *